(12) United States Patent
Russell et al.

(10) Patent No.: US 10,453,353 B2
(45) Date of Patent: Oct. 22, 2019

(54) READING COMPREHENSION APPARATUS

(71) Applicant: Full Tilt Ahead, LLC, Norcross, GA (US)

(72) Inventors: Lillian Roxanne Russell, Norcross, GA (US); John Thomas Evans, IV, Cumming, GA (US); Adarsh Sudhanva Char, Norcross, GA (US); Joshua Andrew Cuevas, Dawsonville, GA (US); Vijaykant Nadadur, Bangalore (IN)

(73) Assignee: Full Tilt Ahead, LLC, Norcross, GA (US)

( * ) Notice: Subject to any disclaimer, the term of this patent is extended or adjusted under 35 U.S.C. 154(b) by 615 days.

(21) Appl. No.: 14/963,043

(22) Filed: Dec. 8, 2015

(65) Prior Publication Data
US 2016/0163219 A1    Jun. 9, 2016

Related U.S. Application Data

(60) Provisional application No. 62/089,689, filed on Dec. 9, 2014.

(51) Int. Cl.
| | |
|---|---|
| G09B 17/00 | (2006.01) |
| G09B 5/02 | (2006.01) |
| G06F 3/0484 | (2013.01) |
| G06T 13/80 | (2011.01) |
| G06F 17/27 | (2006.01) |
| G09B 19/04 | (2006.01) |

(52) U.S. Cl.
CPC ........... *G09B 5/02* (2013.01); *G06F 3/04842* (2013.01); *G06F 17/277* (2013.01); *G06T 13/80* (2013.01); *G09B 17/003* (2013.01); *G09B 19/04* (2013.01)

(58) Field of Classification Search
CPC ......... G09B 17/003; G09B 19/04; G09B 5/02
See application file for complete search history.

(56) References Cited

U.S. PATENT DOCUMENTS

| | | | |
|---|---|---|---|
| 5,827,071 A | * | 10/1998 | Sorensen ............... G09B 5/065 434/323 |
| 6,568,939 B1 | | 5/2003 | Edgar |

(Continued)

OTHER PUBLICATIONS

Evident Point, Active Textbook, information downloaded from website, retrieved on Dec. 8, 2014, https://activetextbook.com/.

(Continued)

*Primary Examiner* — Eddy Saint-Vil
(74) *Attorney, Agent, or Firm* — Moyles IP, LLC

(57) ABSTRACT

According to some embodiments, a reading comprehension apparatus comprises a processor, an optimized reading comprehension display, and a selection tool to select text within a digitized portion of a written work. A word ranking engine ranks each word from the selected text, via the processor. A filtering engine identifies a plurality of top-ranked words within the selected text and an animation engine animates and displays each of the top-ranked words identified by the processor in a sequential manner on the optimized reading comprehension display. Furthermore, the animation engine displays a presentation of the selected text including the top-ranked words in a highlighted manner.

18 Claims, 6 Drawing Sheets

(56) References Cited

U.S. PATENT DOCUMENTS

| | | | | |
|---|---|---|---|---|
| 6,652,283 | B1* | 11/2003 | Van Schaack | G09B 5/00 434/236 |
| 7,613,731 | B1* | 11/2009 | Larson | G06F 17/212 434/178 |
| 2003/0003428 | A1 | 1/2003 | Dalstrom | |
| 2006/0040242 | A1* | 2/2006 | Mejia | G09B 1/00 434/170 |
| 2006/0277046 | A1* | 12/2006 | Lachish | G09B 19/04 704/272 |
| 2007/0248938 | A1* | 10/2007 | Ronald | G09B 5/06 434/178 |
| 2009/0162818 | A1* | 6/2009 | Kosakowski | G09B 5/06 434/157 |
| 2009/0307207 | A1* | 12/2009 | Murray | G06F 17/30026 |
| 2012/0289147 | A1* | 11/2012 | Raleigh | H04L 67/2847 455/3.06 |
| 2013/0100139 | A1* | 4/2013 | Schliesser | G09B 5/02 345/467 |
| 2013/0159850 | A1* | 6/2013 | Cohn | G06F 17/211 715/273 |
| 2016/0125754 | A1* | 5/2016 | Aaron | G09B 17/04 434/169 |

OTHER PUBLICATIONS

Cuevas, et al., An examination of the effect of customized reading modules on diverse secondary students' reading comprehension and motivation, Mar. 24, 2012, https://rd.springer.com/content/pdf/10.1007%2Fs11423-012-9244-7.pdf.

Eric Blue, Learning Faster—Automatically Extract Highlighted Text from PDF Documents, Blog, Dec. 17, 2010, http://eric-blue.com/2010/12/17/.

Textanim, textanim 2.0, website, Date unknown, http://textanim.com/.

Spritz, Spritz, website, Date unknown, http://spritzinc.com/.

Joshua A. Cuevas, Applied Cognition in Reading: An Analysis of Reading Comprehension in Secondary School Students, Dissertation, Oct. 26, 2010, https://pdfs.semanticscholar.org/9441/49e0d9d98f8cf9657636e6265735c9590f6e.pdf.

* cited by examiner

READING COMPREHENSION APPARATUS

CROSS-REFERENCE TO RELATED APPLICATIONS

This application claims priority to U.S. Provisional Patent Application No. 62/089,689, filed Dec. 9, 2014, which is incorporated herein by reference in its entirety.

BACKGROUND

An abundance of technological innovations continue to be developed for the purpose of enhancing ability and interest in reading. Most of these innovations, however, are comprehensive software reading programs that restrict reading choices to the texts chosen by the reading program software developers. While tools exist to animate text within a presentation, (e.g. a presentation prepared and displayed using, for instance, Microsoft's POWERPOINT™ slide show presentation program), such programs require users to choose words and apply animation to each word individually. With current technology, a user with advanced technical skills would need to perform seventeen specialized steps per word to create a presentation.

Similarly, Rapid Serial Visual Presentation (RSVP) is currently available and provides sequential, central placement of text, which is captured in and offered in devices or through source code available on the Internet. The RSVP process typically presents an entire text one word at a time in the same central place on a screen, in a continuous presentation of visual items, which is around 10 items per second.

Many learning institutions require students or users to use tablets (e.g., Apple based or Android based tablets) for testing, reading material, notes, lessons, etc. Tools exist to provide customizable reading comprehension enhancement for specific texts (e.g. ACTIVE TEXTBOOK™ commercially available from Evident Point), for use in conjunction with such tablets or desktop computers made available to the students, as would be understood by one of ordinary skill in the art. Reading material (e.g., text based reading material in a digital format) may include a plurality of key words and phrases that can be classified into levels (e.g., grades) based on an ability of the user. However, determining which phrases and/or words within the reading material are appropriate for a particular level of user may be difficult to determine. Furthermore, being able to point out the important words or phrases to the user may be difficult and time consuming for the teacher, tutor, mentor, trainer, guide or instructor. Therefore, it is desired to have a machine that can determine appropriate words and/or phrases for a user to emphasize and to display those appropriate words and/or phrases to the user.

Thus, currently available technology such as these described hereinabove do not provide an optimized learning experience, at least because it does not animate words specifically intended to enhance comprehension or help readers construct meaning and interpretation. The concepts presented herein overcome the shortcomings of currently available technology and provides visually interesting display of selected text and additional cognitive scaffolding tools for reading comprehension.

BRIEF DESCRIPTION OF THE FIGURES

A more particular description will be rendered by reference to specific embodiments thereof that are illustrated in the appended drawings. Understanding that these drawings depict only typical embodiments and are not therefore to be considered to be limiting of its scope, exemplary embodiments will be described and explained with additional specificity and detail through the use of the accompanying drawings in which.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

DETAILED DESCRIPTION

Reference will now be made in detail to embodiments. Each example is provided by way of explanation, and is not meant as a limitation and does not constitute a definition of all possible embodiments.

The present embodiments relate to an apparatus to select a portion of text from a digital document, highlight appropriate words and phrases based on a user's level, and present the highlighted words and phrases to the user. The appropriate words and phrases may correspond to a selected topic as well as a reading level of a user viewing the selected portion of text.

Figure 1:
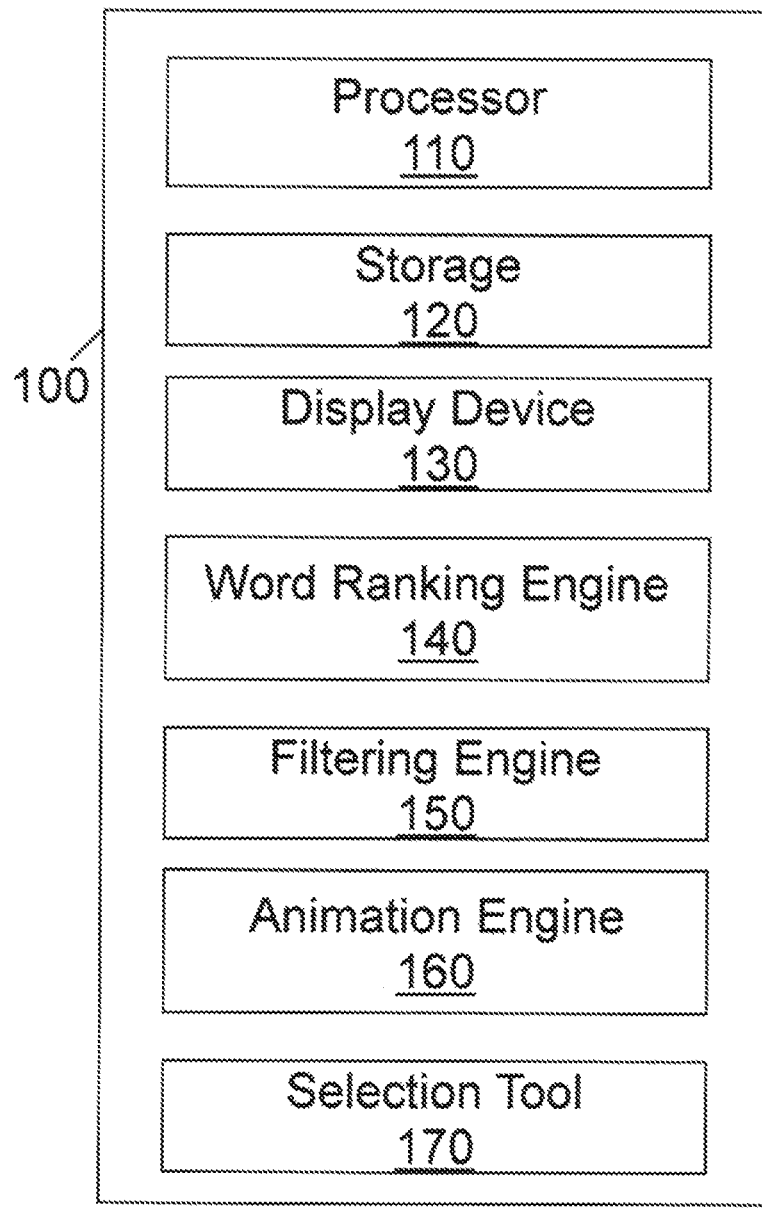
FIG. 1 is a block diagram representation of a reading comprehension apparatus according to some embodiments.

Now referring to FIG. 1, an embodiment of a reading comprehension apparatus 100 is illustrated, which finds particular utility as a teaching apparatus and/or learning apparatus. The reading comprehension apparatus 100 may comprise a processor 110, a storage 20, a display device 130, a word ranking engine 140, a filtering engine 150, an animation engine 160 and a selection tool 170. In some embodiments the word ranking engine 140, the filtering engine 150, and the animation engine 160 may utilize a single hardware processor. However, in some embodiments, the word ranking engine 140, the filtering engine 150, and the animation engine 160 may utilize a plurality of hardware processors 110.

The processor 110 may comprise hardware that includes or is otherwise associated with dedicated registers, stacks, queues, etc. that are used to execute program code and/or one or more of these elements may be shared therebetween. In some embodiments, the processor 110 may comprise an integrated circuit and the processor 110 may comprise circuitry to perform a method or process based on the embodiments described herein.

The selection tool 170 may comprise, for example, a keyboard, a mouse or other pointing device, a switch, an infrared port, a camera and/or a touch screen that is in communication with the processor 110. The selection tool 170 may be used to receive a selection of text or input data about a user, a subject or a reading level or other input parameters, user selections and information associated with reading material. The processor 110 may also be in communication with a display device 130. The display device 130 may comprise, for example, a display (e.g., a touch screen) such as a tablet display or a separate computer monitor. In some embodiments, the display device 130 may be optimized for reading comprehension. For example, the display device 130 may display the screen at least at 90% wide and 90% tall to optimize use of a display area with the remaining screen area reserved for padding or for use as a graphical user interface ("GUI") to control the reading comprehension apparatus.

The storage device 120 may comprise a non-transitory computer-readable medium to store a program for controlling the processor 110. The program may be stored in a compressed, uncompiled and/or encrypted format. The program may furthermore include other program elements, such as an operating system, a database management system, and/or device drivers used by the processor 110 to interface with peripheral devices. The computer-readable medium may comprise a method or process based on the disclosed embodiments.

Figure 2:
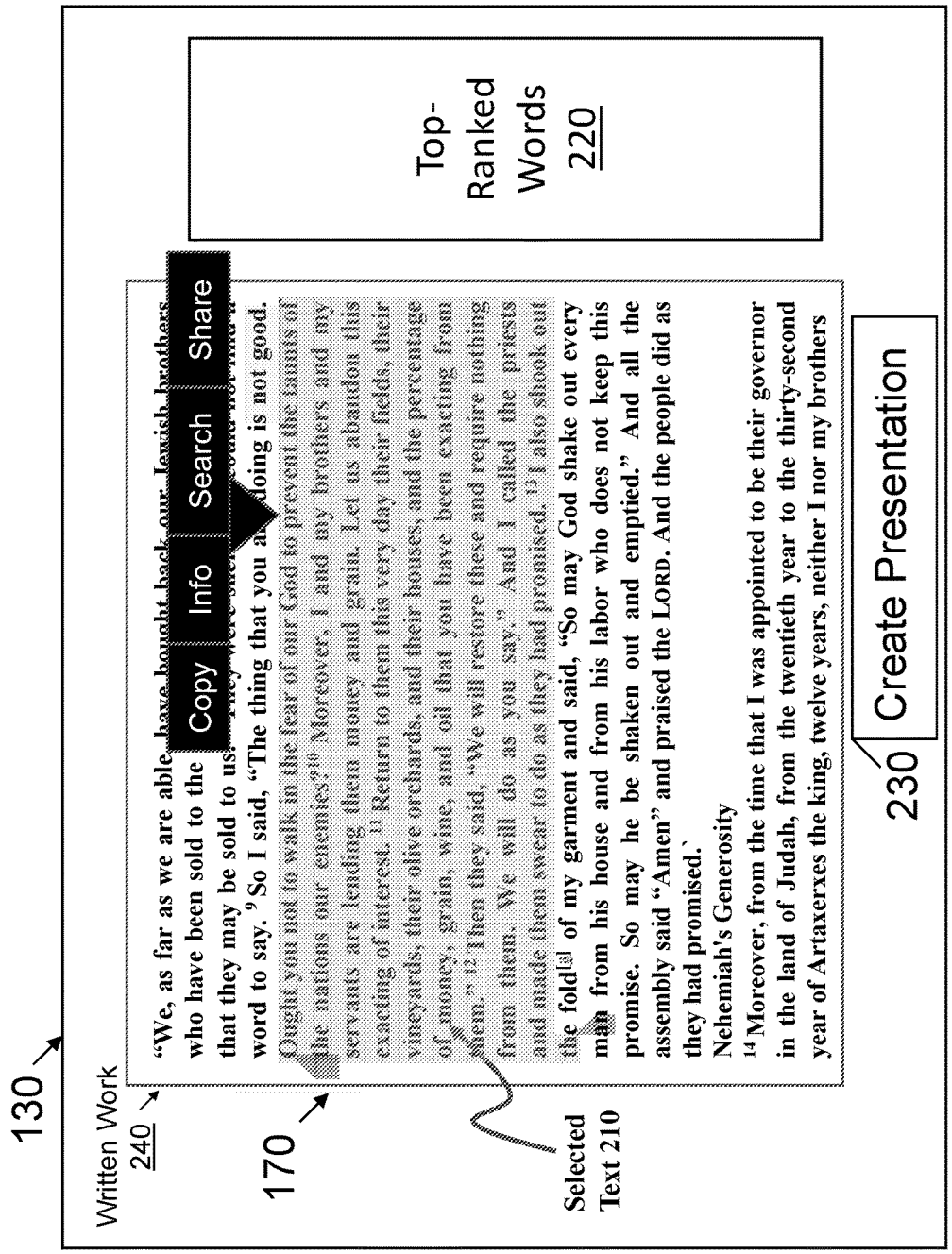
FIG. 2 is a portion of a display screen according to an embodiment.

Now referring to FIG. 2, an embodiment of a display screen 130 is illustrated. As illustrated in FIG. 2, a user may view a written work 240 that comprises a plurality of words, sentences and phrases. In some embodiments the written work 240 may comprise a digitized written work. Using the selection tool 170, the user may select a digitized portion of the written work 240 to define a selected text 210.

Once the selected text 210 has been defined, the user may initiate a create presentation instruction 230 that may be in the form of a graphical user interface ("GUI") button or other GUI object. Once the create presentation instruction 230 is initiated, a plurality of top-ranked words 220 may be displayed on the display device 130. To determine the top-ranked words 220, the word ranking engine 140 may rank each word from the selected text 210 via the processor 110. The word ranking engine 140 may receive the selected text 210 via a web browser or a dedicated application associated with the reading comprehension apparatus.

The word ranking engine 140 may scan each word of the selected text 210 and pass the selected text 210 through a Part-Of-Speech Tagger ("PoS Tagger") which comprises a system to scan a text document based on a specific indicated language. The scanned text may be transmitted to third-party vendor, which acts as PoS Tagger or the PoS Tagger may be internal to the word ranking engine 140. Each word in the scanned text is then indicated as a specific part of speech type. For example, the selected text 210 may be scanned using American English language and each word in the selected text 210 may be indicated as a noun, verb, adjective, noun-plural etc. The output from the PoS tagger may comprise PoS tagged text that is stored in an intermediate file. The intermediate file may comprise a flat file that includes the PoS tagged text and the indicators of speech type. In some embodiments, the intermediate file may comprise a table, list, array, linked list or other data structure or the intermediate file may be stored as a database table. In some embodiments, the word ranking engine 140 may rank words based on a crowd sourced user history of words that have been selected and/or deselected by a plurality of users. For example, if a predetermined number of users have previously selected the word "idea", the word ranking engine 140 may tag the word "idea" based on the word "idea" having been previously selected by the predetermined number of users.

Once the intermediate file is created, relevant tagged words may be identified. In some embodiments, relevant tagged words may comprise nouns, adjectives, verbs, and adverbs. However, in other embodiments different individual speech types or different combinations of speech type may also be considered relevant.

According to an embodiment, various structural cues may be identified in which it is possible to establish rules for word selection/tagging of the relevant tagged words. For instance, the next occurring noun following a numerical, (e.g., number, all, no, every), would be selected in an embodiment. Another example would be to identify demonstratives, (e.g., this, that, these, those), and then select a noun that immediately follows the demonstrative, if present. For example, the word "idea" would be selected from the following sentence: "This idea took root." An example in which no word selection would occur following a demonstrative can be found in the following sentence: "This led to many years of misery." In the aforementioned example, a verb follows a demonstrative and therefore, the verb was not selected. Another example would be to identify lists of words by the consecutive arrangement of words or phrases of parallel grammatical form separated by commas and end and include a conjunction, such as red, white and blue. Yet another example includes selecting emphasis indicators. For instance, after the words "always" and "never", the next occurring verb would be selected. It may be possible to also select superlative adjectives, such as "greatest," "prettiest," as well as any word or phrase that follows a dash. If after other filters have been applied (vocabulary lists and structural cues), no other words have been selected, it is possible to set a default to choose one noun and one verb, (e.g., not linking, auxiliary or modal verbs). Non-limiting examples of linking verbs include all forms of the verb "to be" and the sensory verbs, (e.g., feels, sees). Examples of auxiliary verbs include the verbs "do" and "have", while modal verbs include "can," "could," "shall," "should," "will," "would," "may," "might," and "must."

Figure 3:
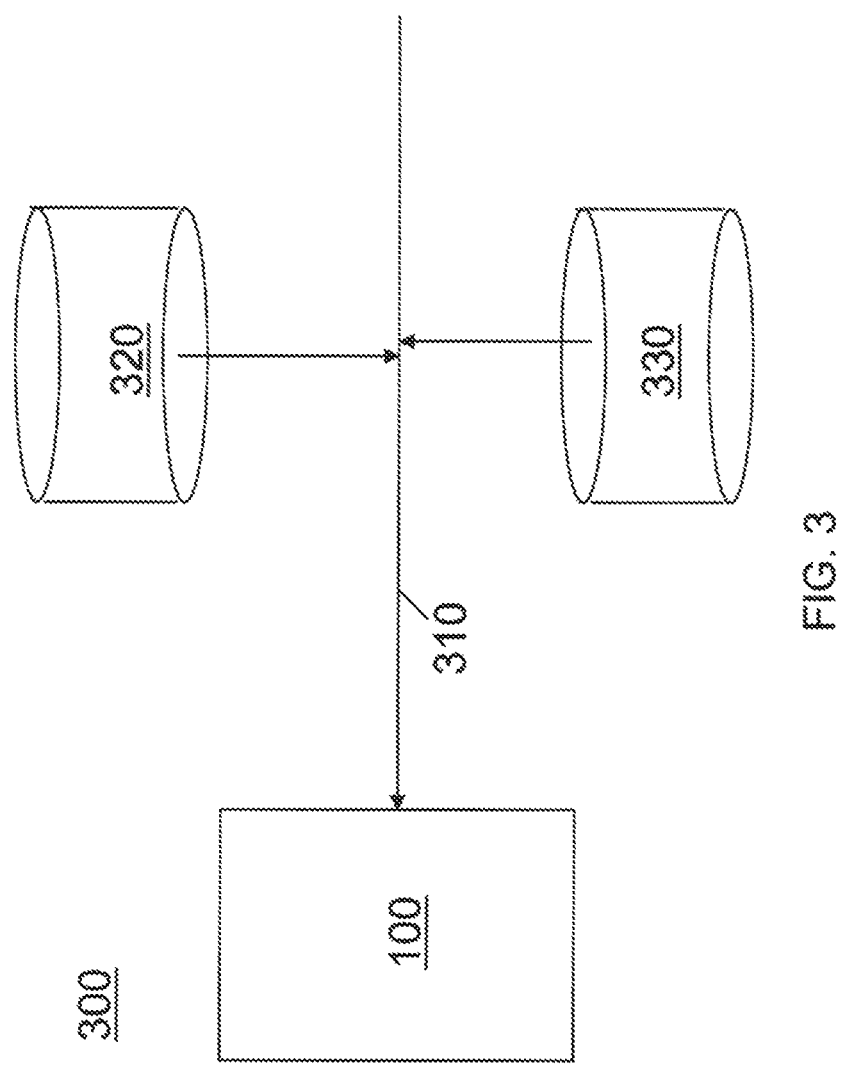
FIG. 3 is a system according to an embodiment.

Now referring to FIG. 3, a system 300 is illustrated. The system 300 comprises the reading comprehension apparatus 100, a network 310, a vocabulary database 320 and secondary database 330. While illustrated as separate databases (e.g., database servers), the vocabulary database 320 and secondary database 330 may comprise a single database or database server. The secondary database 330 may comprise user defined variables, a lexical Database and/or previous user generated data content. The vocabulary database 320 may comprise a relational database and may be queried to determine if the relevant tagged words are stored in the vocabulary database 320. If a word exists in the vocabulary database 320, the word may be indicated as a top-ranked word. In some embodiments, an option for the reader or user to select or deselect additional keywords based on a PoS tag may be provided.

The selected text 210 may be stored in the vocabulary database 320 and may be stored with a hash index or hash mapping of the selected text 210. The hash index may be based on a hash function and may serve as a unique identifier in the vocabulary database for each word of the selected text 210. In some embodiments, specific words of the selected text 210 may be stored as part of a word list in the vocabulary database 320. The specific words may be entered by a user or may comprise system highlighted words based on a subject, a grade level, a reading level, a learning level, a library, a lexicon, a type, a critical lens, a purpose, and/or a taxonomy.

A ranking of words in the word list may be incremented based on a frequency of the particular word being selected by a user, automatically selected by the reading comprehension apparatus 100 and/or a frequency of occurrence in the selected text 210. Likewise, the ranking of words in the word list may be decremented based on a frequency of the particular word being deselected by a user from the word-list. For example, when a particular word corresponds to a same hash index as another word, it may be deselected. The word list may be used to determine the top-ranked words 220 which may be ranked based on a subject, a grade level, a reading level, a learning level, a library, a lexicon, a type, a critical lens, a purpose, a taxonomy, and the like, or combinations thereof. In some embodiments, the top-ranked words 220 may be further ranked based on a percentage of a total number of the words within the selected text 210. For example, the percentage of the total number of the words may comprise about 0.5% to about 1% of the selected text 210. In other embodiments, the top-ranked words 220 may be further ranked based on a percentage of how many times each top-ranked word 220 appears within the selected text.

The filtering engine 150 may identify, via the processor 110, the plurality of top-ranked words 220 within the selected text 210. Once ranked, and filtered, the top-ranked words 220 may be displayed alongside the selected text 210, as depicted in FIG. 2.

Figure 4:
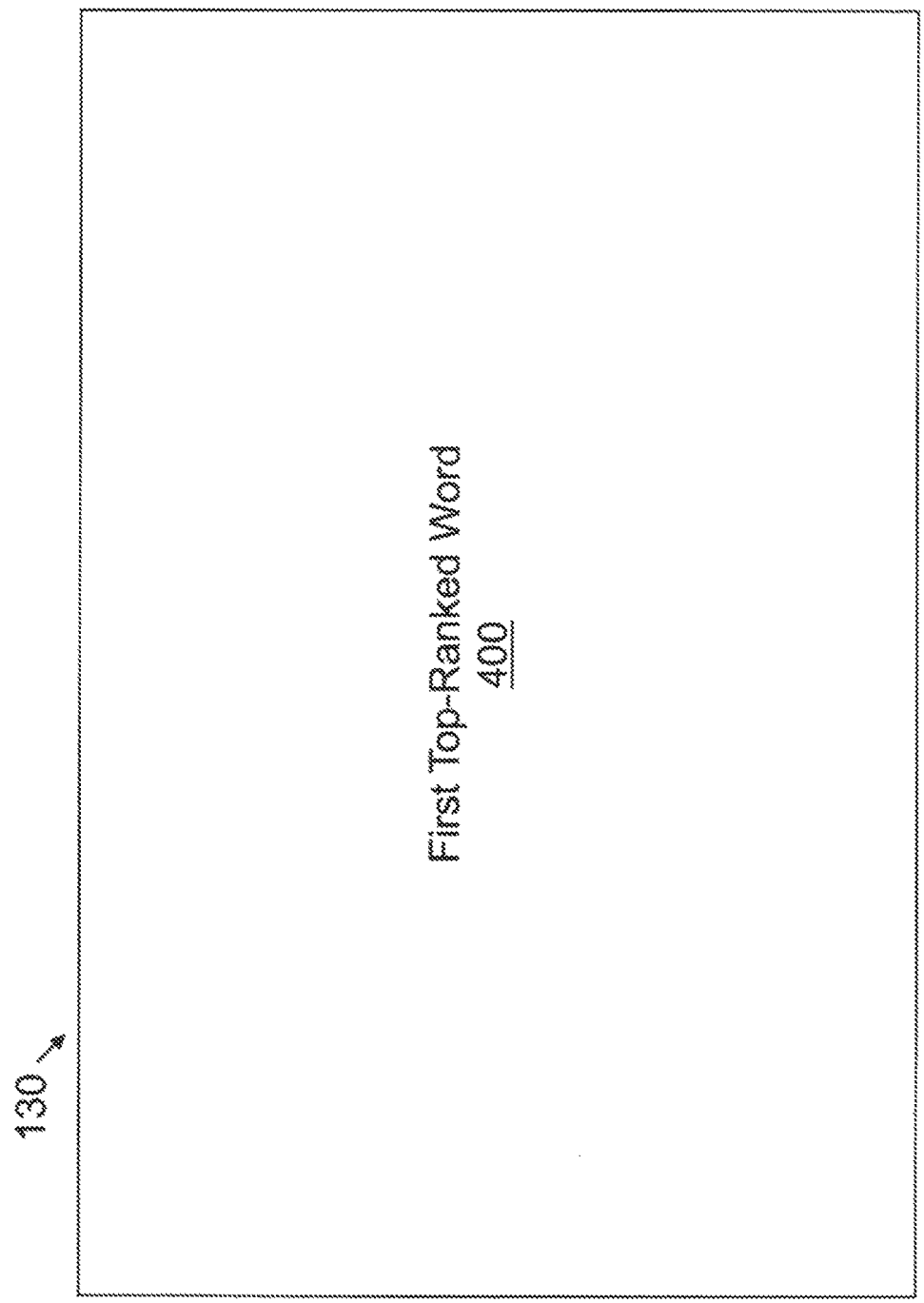
FIG. 4 is a portion of a display screen according to an embodiment.
Figure 5:
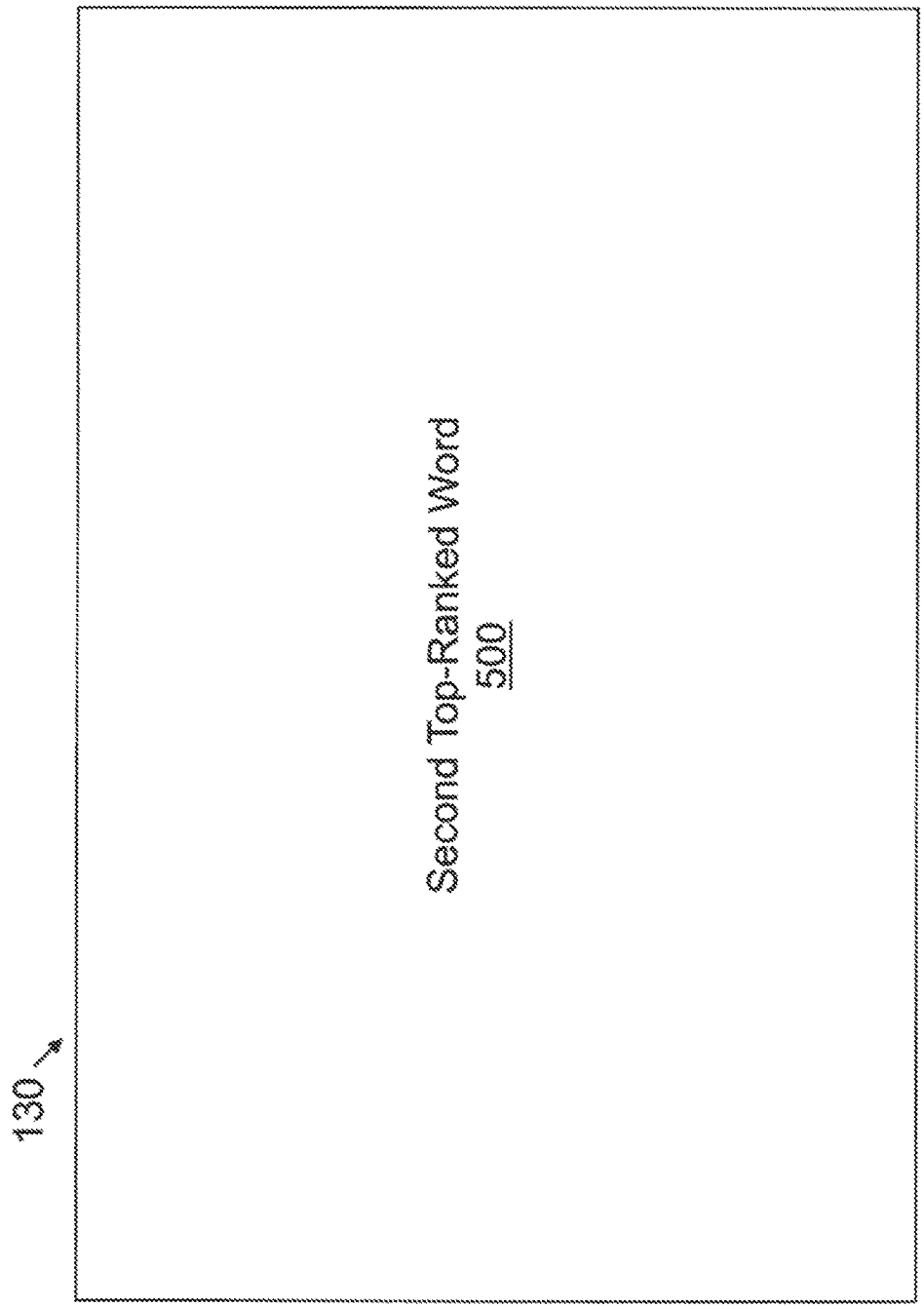
FIG. 5 is a portion of a display screen according to an embodiment.
Figure 6:
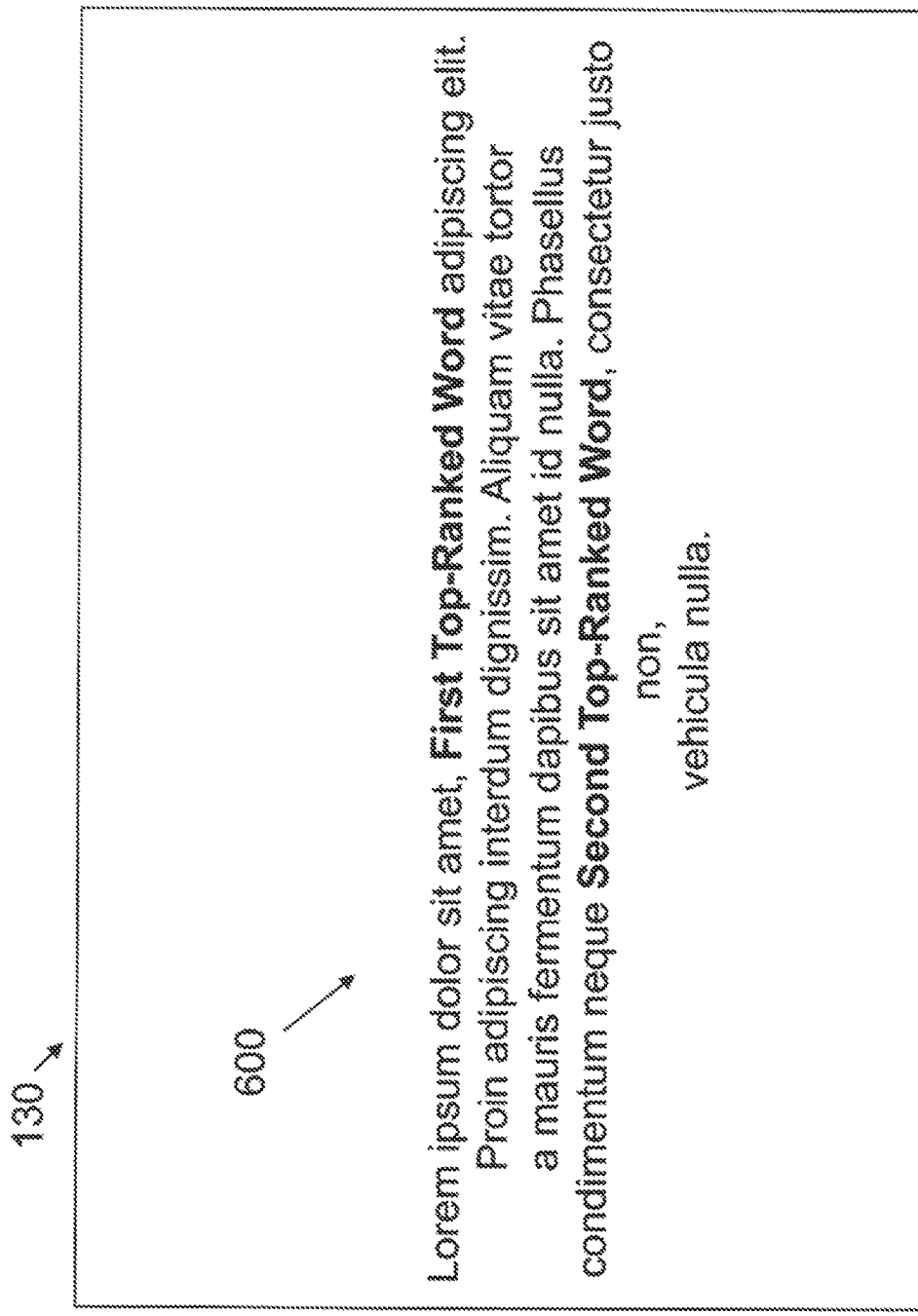
FIG. 6 is a portion of a display screen according to an embodiment.

Continuing with the above example, and now referring to FIG. 4, FIG. 5, and FIG. 6, an embodiment of a display screen 130 displaying animated words is illustrated. By "animation" what is meant is that the words are presented with a visual effect to add variety and visual interest, as will be discussed in greater detail hereinbelow. Words selected for animation may comprise the top-ranked words 220 and may be animated by the animation engine 160. The animation engine 160 may animate and display each of the top-ranked words 220 identified by the processor 110 in a sequential manner and may display a presentation 600 of the selected text 210 including the top-ranked words 220 in a highlighted manner, for instance. In some embodiments, the top-ranked words 220 may also be based on a custom selection of words indicated by one or more users.

For example, and now referring to FIG. 4 and FIG. 5, a first top-ranked word 400 may be animated on the display device 130 followed by a second top-ranked word 500 being animated on the display device 130. Animation, includes but is not limited to displaying the words as bolded, highlighted in a different color than the selected text 210, comprising a different color background than the selected text 210, comprising a different font style than the selected text 210, by moving the words around the screen, flashing, visual/pictorial icons, cycling through a plurality of fonts, and the like, or combinations thereof The top-ranked words 220 may be animated and displayed in a sequential manner that comprises transitioning top-ranked words 220 in an order in which the top-ranked words 220 first appear in the written work 240. In some embodiments, the sequential manner in which the top-ranked words 220 are animated and displayed comprises transitioning randomly without regard to an order in which the top-ranked words 220 appear in the written work 240.

Now referring to FIG. 6, an embodiment of a presentation 600 is illustrated. The presentation 600 may comprise the selected text 210 including the top-ranked words (bolded for this figure) to display to the user. In some embodiments, after the reading comprehension apparatus 100 displays the first and second top-ranked words 400/500, the reading comprehension apparatus 100 may present the first and second top-ranked words 400/500 within the selected text 210 as a presentation 600. In the presentation 600 the first and second top-ranked words 400/500 may be animated so that the user can more easily focus on the first and second top-ranked words 400/500.

In some embodiments, the secondary database may further comprise a dictionary to provide a definition of the top-ranked words 220. For example, when a first and/or second top-ranked word 400/500 is being animated, a user may indicate a top-ranked word 220 by touching the top-ranked word (e.g., in a case where the display device is a touch screen) and a definition of the top-ranked word may be displayed.

In order to display the selected text 210, the selected text 210 may first be segmented by the animation engine 160. Since the selected text 210 in its entirety may not fit on a single optimized display screen, the selected text 210 may be segmented into a plurality of portions. For example, portions may comprise a predefined number of paragraphs or a predefined number of sentences. In some embodiments, portions may be limited to 330 words so as to not overcrowd the selected text 210 on the optimized display screen or to limit an amount of displayed words so that the top-ranked words are more easily seen by a user. Thus, in some embodiments, each portion may be defined as a series of words ending with a period, or other ending punctuation such as a question mark or exclamation point, between a 300th word and a 330th word. Furthermore, if a portion is determined to have greater than 330 words, the particular portion may be subdivided into sub-portions by dividing the portion at a closest period or ending punctuation past a halfway point of the portion.

Once the selected text 210 is segmented into a plurality of portions, each portion may be displayed in an order in which the selected text 210 was segmented. For example, if the selected text 210 is segmented into three portions, a first portion may be indicated as portion number one, a second portion may be indicated as portion number two and a third portion may be indicated as portion number three. In this manner, portions may be displayed in a forward order or, in some embodiments, the portions may be displayed in a reverse order or in a random order.

The components and methods illustrated are not limited to the specific embodiments described herein, but rather, features illustrated or described as part of one embodiment can be used on or in conjunction with other embodiments to yield yet a further embodiment. It is intended that the method, machine and computer-readable medium described herein include such modifications and variations.

While the apparatus and method described herein have been described with reference to a preferred embodiment, it will be understood by those skilled in the art that various changes may be made and equivalents may be substituted for elements thereof without departing from the scope contemplated. In addition, many modifications may be made to adapt a particular situation or material to the teachings found herein without departing from the essential scope thereof.

In this specification and the claims that follow, reference will be made to a number of terms that have the following meanings. The singular forms "a," "an" and "the" include plural referents unless the context clearly dictates otherwise. Furthermore, references to "one embodiment", "some embodiments", "an embodiment" and the like are not intended to be interpreted as excluding the existence of additional embodiments that also incorporate the recited features.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

What is claimed is:

1. A reading comprehension apparatus comprising:
   an optimized reading comprehension display configured for displaying a digitized written work;
   a selection tool configured for a user to select text within a digitized portion of the written work displayed on the optimized reading comprehension display, wherein the selection tool includes at least one of a keyboard, a pointing device, a switch, an infrared port, a camera, and a touch screen; and,
   one or more processors, wherein the one or more processors is in communication with, and responsive to, the selection tool and includes hardware that executes program code for
      passing a plurality of words from the selected text through a Part-Of-Speech (PoS) Tagger to associate a speech type with each of the plurality of words, and identifying one or more relevant PoS tagged words based on at least one of the speech type and a structural cue,
   querying a vocabulary database including a plurality of stored words and determining whether any of the one or more relevant PoS tagged words is a stored word in the vocabulary database, and ranking as a top-ranked word any of the one or more relevant PoS tagged words that is a stored word in the vocabulary database, wherein the vocabulary database is configured for storing one or more of the plurality of words from the selected text as a part of a word list in the vocabulary database, wherein the words in the word list are at least one of entered by a user and system highlighted words based on a subject, a grade level, a reading level, a learning level, a library, a lexicon, a type, a critical lens, a purpose, and a taxonomy,
   ranking the respective words in the word list by incrementing a ranking based on at least one of a frequency of the word being selected by the user and the word being a system highlighted word,
   decrementing the ranking based on a frequency of the word being deselected from the word list by a user,
   identifying top-ranked words in the word list from the respective rankings,
   identifying the top-ranked words within the selected text,
   segmenting the selected text after a portion between word 300 and word 330 of the selected text, wherein the portion is defined as a series of words ending with a punctuation mark,
   displaying on the optimized reading comprehension display each of the top-ranked words in a sequential manner, and
   displaying on the optimized reading comprehension display the portion of the selected text, including animating the top-ranked words in the portion of the selected text in a manner including at least one of bolding, highlighting in a different color than the selected text, using a different font style than the selected text, moving, flashing, using visual icons, and cycling through a plurality of fonts, wherein segmenting the selected text is performed prior to respectively displaying and animating the portion of the selected text and the top-ranked words within the selected text.

2. The reading comprehension apparatus of claim 1, wherein ranking the top-ranked words further includes ranking the top-ranked words based on the subject, the grade level, the reading level, the learning level, the library, the lexicon, the type, the critical lens, the purpose, and the taxonomy.

3. The reading comprehension apparatus of claim 1, wherein ranking the top-ranked words further includes ranking the top-ranked words based on a percentage of a total number of the words comprised within the selected text.

4. The reading comprehension apparatus of claim 3, wherein the percentage of the total number of the words is about 0.5% to about 1%.

5. The reading comprehension apparatus of claim 1, wherein ranking the top-ranked words further includes ranking the top-ranked words based on a percentage of how many times the respective top-ranked words appear within the selected text.

6. The reading comprehension apparatus of claim 1, wherein the sequential manner in which the top-ranked words are displayed comprises transitioning in an order in which the top-ranked words first appear in the written work.

7. The reading comprehension apparatus of claim 1, wherein the sequential manner in which the top-ranked words are displayed comprises transitioning randomly without regard to an order in which the top-ranked words appear in the written work.

8. The reading comprehension apparatus of claim 1, wherein the hardware executes program code for accessing a dictionary to provide a definition of the top-ranked words.

9. A reading comprehension apparatus comprising:
   an optimized reading comprehension display including a first display area for displaying a digitized portion of a written work and a second display area for displaying one or more top-ranked words from the digitized portion of the written work;
   a selection tool interactive with the first display area and the second display area and operative for a user to select text within the digitized portion of the written work in the first display area, wherein the selection tool includes at least one of a keyboard, a pointing device, a switch, an infrared port, a camera, and a touch screen; and
   one or more processors, wherein the one or more processors is in communication with, and responsive to, the selection tool and includes hardware that executes program code for determining top-ranked words from the selected text, and the selection tool is operative for a user to select additional top-ranked words from the selected text in the first display area and deselect top-ranked words in the second display area, wherein determining top-ranked words from the selected text is based at least in part on incrementing a rank based on a frequency with which a word is selected from the selected text and decrementing the rank based on a frequency with which the word is deselected from the top-ranked words, wherein the hardware further executes program code for segmenting the selected text after a portion between word 300 and word 330 of the selected text, wherein the portion is defined as a series of words ending with a punctuation mark, displaying in the second display area each of the top-ranked in a sequential manner, and displaying in the first display area the portion of the selected text, including animating the top-ranked words in the portion of the selected text in a manner including at least one of bolding, highlighting in a different color than the selected text, using a different font style than the selected text, moving, flashing, using visual icons, and cycling through a plurality of fonts, wherein segmenting the selected text is performed prior to respectively displaying and animating the portion of the selected text and the top-ranked words within the selected text.

10. The reading comprehension apparatus of claim 9, wherein the sequential manner in which the top-ranked words are displayed is transitioning in an order in which the top-ranked words first appear in the written work.

11. The reading comprehension apparatus of claim 9, wherein the sequential manner in which the top-ranked words are displayed is transitioning randomly without regard to an order in which the top-ranked words appear in the written work.

12. The reading comprehension apparatus of claim 9, wherein determining the top-ranked words from the selected text includes ranking the respective words from the selected text based on at least one of a subject, a grade level, a reading level, a learning level, a library, a lexicon, a type, a critical lens, a purpose, and a taxonomy.

13. The reading comprehension apparatus of claim 9, wherein determining the top-ranked words from the selected text includes ranking the respective words from the selected text based on a percentage of a total number of the words comprised within the selected text.

14. The reading comprehension apparatus of claim 13, wherein the percentage of the total number of the words comprised within the selected text is about 0.5% to about 1%.

15. The reading comprehension apparatus of claim 9, wherein determining the top-ranked words from the selected text includes ranking the respective words from the selected text based on a percentage of how many times the top-ranked words appear within the selected text.

16. The reading comprehension apparatus of claim 9, wherein the hardware executes program code for querying a vocabulary database.

17. The reading comprehension apparatus of claim 9, wherein the selection tool is configured for a user to select a top-ranked word in the second display, and the hardware executes program code for accessing a dictionary and displaying a definition of the selected word in the first display area, the second display area, or a third display area.

18. A method, carried out by one or more processors including hardware that executes program code, for enhancing reading comprehension using an optimized reading comprehension display, comprising:

displaying a digitized written work in a first display area of the optimized reading comprehension display;

selecting with a selecting tool responsive to a user input text within the digitized written work in the first display area, wherein the selection tool includes at least one of a keyboard, a pointing device, a switch, an infrared port, a camera, and a touch screen;

passing a plurality of words from the selected text through a Part-Of-Speech (PoS) Tagger to associate a speech type with each of the plurality of words;

identifying one or more relevant PoS tagged words based on at least one of the speech type and a structural cue;

querying a vocabulary database to determine whether any of the one or more relevant PoS tagged words is a stored word in the vocabulary database, and ranking as a top-ranked word any of the one or more relevant PoS tagged words that is a stored word in the vocabulary database;

storing as part of a word list in the vocabulary database one or more of the plurality of words from the selected text;

ranking the respective words in the word list by incrementing a ranking based on at least one of a frequency of a word being selected by the user and the word being a system highlighted word and decrementing the ranking based on a frequency of the word being deselected from the word list by the user;

identifying top-ranked words in the word list from the respective rankings;

identifying within the selected text the top-ranked words of the one or more relevant PoS tagged words and the word list;

segmenting the selected text after a portion between word 300 and word 330 of the selected text, wherein the portion is defined as a series of words ending with a punctuation mark;

displaying in the second display area each of the top-ranked in a sequential manner;

displaying in the first display area the portion of the selected text, including animating the top-ranked words in the portion of the selected text in a manner including at least one of bolding, highlighting in a different color than the selected text, using a different font style than the selected text, moving, flashing, using visual icons, and cycling through a plurality of fonts, wherein segmenting the selected text is performed prior to respectively displaying and animating the portion of the selected text and the top-ranked words within the selected text.

\* \* \* \* \*